(12) United States Patent
Peng

(10) Patent No.: US 9,805,766 B1
(45) Date of Patent: Oct. 31, 2017

(54) VIDEO PROCESSING AND PLAYING METHOD AND VIDEO PROCESSING APPARATUS THEREOF

(71) Applicant: Sheng-Hua Peng, Taipei (TW)

(72) Inventor: Sheng-Hua Peng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/213,412

(22) Filed: Jul. 19, 2016

(51) Int. Cl.
*H04N 5/77* (2006.01)
*G11B 27/28* (2006.01)
*G06K 9/00* (2006.01)
*G06K 9/62* (2006.01)

(52) U.S. Cl.
CPC .......... *G11B 27/28* (2013.01); *G06K 9/00228* (2013.01); *G06K 9/00268* (2013.01); *G06K 9/00302* (2013.01); *G06K 9/00335* (2013.01); *G06K 9/6201* (2013.01)

(58) Field of Classification Search
USPC .......................................... 386/223–228, 248
See application file for complete search history.

(56) References Cited

U.S. PATENT DOCUMENTS

| | | | |
|---|---|---|---|
| 7,466,898 B2 * | 12/2008 | Ohashi | H04N 7/163 386/241 |
| 7,650,057 B2 * | 1/2010 | Takeshita | H04N 5/76 386/248 |
| 9,251,854 B2 | 2/2016 | Steiner | |
| 2008/0080743 A1 | 4/2008 | Schneiderman et al. | |
| 2014/0137144 A1 * | 5/2014 | Jarvenpaa | H04N 21/4667 725/13 |
| 2015/0110471 A1 * | 4/2015 | Zheng | H04N 5/76 386/291 |

FOREIGN PATENT DOCUMENTS

TW    I395143    5/2013

* cited by examiner

*Primary Examiner* — Nigar Chowdhury
(74) *Attorney, Agent, or Firm* — JCIPRNET

(57) ABSTRACT

A video processing and playing method adapted to a video processing apparatus is provided. The method includes the following steps. A digital video is received and the digital video is decoded to obtain a plurality of video frames. The video frames are analyzed to detect a human feature of the digital video. A recognition result of the detected human feature is determined by comparing the detected human feature with a plurality of sample features. The recognition result of the detected human feature is associated with a timestamp according to a time point of detecting the human feature. A first video segment of the digital video played according to the timestamp when receiving a user command selecting the recognition result.

18 Claims, 4 Drawing Sheets

VIDEO PROCESSING AND PLAYING METHOD AND VIDEO PROCESSING APPARATUS THEREOF

BACKGROUND OF THE INVENTION

1. Field of the Invention

The present invention generally relates to a video processing and playing method and a video processing apparatus, in particular, to a video processing and playing method and a video processing apparatus, which are capable of playing a video segment according to video content interesting the user.

2. Description of Related Art

Along with people's increasing reliance on electronic products, various portable electronic apparatuses such as notebook PCs, personal digital assistants (PDAs), smartphones, and tablet PCs are gradually popularized. As such, along with booming development of communication technique, people start to make discussions, perform interactions and share feelings and information through Internet. For example, users may share their own status, the latest news or even locations with their friends, and gradually get used to upload pictures or video to the social networking websites to record their life. That is, the frequency of watching the videos by the users is getting higher these days. Besides, the users may also watch the videos recording movies, TV programs, dramas or some specific events, such as an important conference, a famous concert, a baseball game, etc., through various electronic apparatuses by connecting to a multimedia sharing platform through Internet.

However, the users may not want to watch a whole video from the beginning to the end, since it is time-consuming sometimes and some parts of the video content is not interesting for the users. Especially, the video may contain the content that make the users feel bored. In some cases, the users may choose to skip part of the video content by dragging an index of a playback timeline and search the part that the user is interesting in, but it is inconvenient and some video content that the user is interesting in may be missed.

SUMMARY OF THE INVENTION

Accordingly, the present invention is directed to a video processing and playing method and a video processing apparatus thereof, which are capable of directly playing a video segment that the user is interested in so as to greatly enhance user experience.

According to one of the exemplary embodiments, a video processing and playing method adapted to a video processing apparatus is provided. The method includes the following steps. A digital video is received and the digital video is decoded to obtain a plurality of video frames. The video frames are analyzed to detect a human feature of the digital video. A recognition result of the detected human feature is determined by comparing the detected human feature with a plurality of sample features. The recognition result of the detected human feature is associated with a timestamp according to a time point of detecting the human feature. A first video segment of the digital video played according to the timestamp when receiving a user command selecting the recognition result.

According to one of the exemplary embodiments, a video processing apparatus including a memory and a processor is provided. The memory storing a plurality of instructions, and the processor coupled to the memory is configured for executing the instructions to: receive a digital video and decoding the digital video to obtain a plurality of video frames; analyze the video frames to detect a human feature of the digital video; determine a recognition result of the detected human feature by comparing the detected human feature with a plurality of sample features; associate the recognition result of the detected human feature with a timestamp according to a time point of detecting the human feature; and play a first video segment of the digital video according to the timestamp when receiving a user command selecting the recognition result.

According to one of the exemplary embodiments, the human feature comprises a human face, and the processor is configured to identify the human face in one of the video frames by performing a facial detection on the video frames.

According to one of the exemplary embodiments, the processor is configured to determine a person by performing a facial reorganization through comparing the human face with a plurality of face templates of the sample features.

According to one of the exemplary embodiments, the human feature further comprises a face expression, and the processor is configured to recognize the face expression in the one of the video frames by analyzing the human face.

According to one of the exemplary embodiments, the processor is configured to determine a human emotion by comparing the face expression with a plurality of expression templates of the sample features.

According to one of the exemplary embodiments, the human feature further comprises a body posture, and the processor is configured to identify a human body base on the human face and recognize the body posture by analyzing the human body in one of the video frames.

According to one of the exemplary embodiments, the processor is configured to determine a human action by comparing the body posture with a plurality of posture templates of the sample features.

According to one of the exemplary embodiments, the processor is configured to receive a plurality of sample images, generate the sample features based on the sample images, and establish a template database comprising the sample features.

According to one of the exemplary embodiments, the processor is further configured to segment the digital video according to the recognition result and the timestamp to obtain a plurality of video segments comprising the first video segment.

According to one of the exemplary embodiments, the processor is configured to display a plurality of candidates associated with the recognition result on the screen, and successively play the first video segment and a second video segment among the video segments according to the timestamp when receiving the user command selecting one of the candidates, wherein the recognition result corresponding to the one of the candidates is shown in the first video segment and the second video segment.

Based on above, according to the video processing and playing method and the video processing apparatus in the invention, the digital video is analyzed to detect the human feature of the digital video, and the playback time of the recognition result on the playback timeline may be discovered. Therefore, by selecting the recognition result that interests the user, the user may directly watch a video segment in which the recognition result is shown without redundant operation, which effectively advances the user experience.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
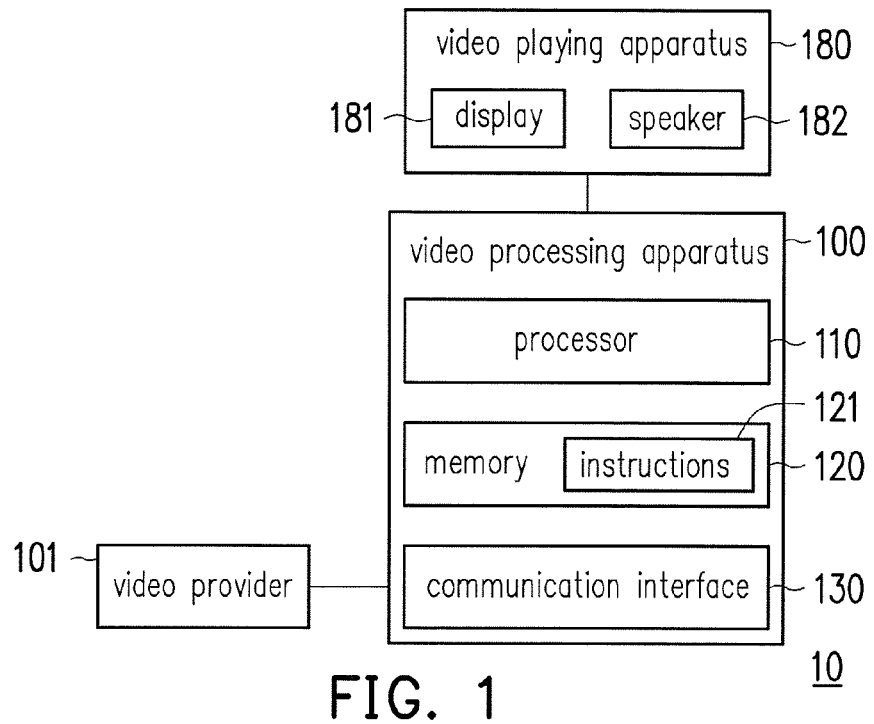
FIG. 1 is a block diagram illustrating a video processing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a video processing apparatus according to an embodiment of the invention.

Please referring to FIG. 1, a video playback system 10 includes a video processing apparatus 100, a video playing apparatus 180 and a video provider 101, and the video processing apparatus 100 is connected to the video provider 101 and the video playing apparatus. The video processing apparatus 100 is an electronic device having video processing capability, such as a set-top box (STB), a DVD player or a Home video game console, a desktop computer, a notebook, a smart phone, a personal digital assistant (PDA), or an online server, etc., but the invention is not limited thereto.

The video processing apparatus 100 is able to receive video data from the video provider 101. In one exemplary embodiment, the video provider 101 may be a multimedia providing server, and the video processing apparatus 100 may receive the video data to be played via Internet. The multimedia providing server may be, for example, a server providing a video-sharing website or a servers providing social network service, but the invention is not limited thereto. In one exemplary embodiment, the video processing apparatus 100, that is able to store video data by itself or is able to read a recording medium storing video data, may be served as a video provider as well.

The video playing apparatus 180 includes a display 181 and a speaker 182, and the video processing apparatus 100 may be electrically connected to the video playing apparatus 180 directly or connected to the video playing apparatus 180 via Internet. The video playing apparatus 180 may play video, audio or image supplied by the video processing apparatus 100 through the display 181 and the speaker 180. In one exemplary embodiment, the video processing apparatus 100 may be combined with the video playing apparatus 180 to form a desktop computer, a notebook, a smart phone, etc., which is not limited by the invention. In one exemplary embodiment, the video processing apparatus 100 and the video playing apparatus 180 may be two independent electronic device connected with each other via Internet.

In detail, please referring to FIG. 1, the video processing apparatus 100 includes a processor 110, a memory 120, and a communication interface 130.

The memory 120 is used for storing data and instructions 121. For example, the memory 120 may include non-transitory storage medium, such as at least one of a hard disk, a memory, and an external storage medium (for example, a flash drive), or a combination thereof, which is not limited by the invention. In an exemplary embodiment, the memory 120 may also include transitory storage medium, such as RAM, which is not limited by the invention.

In an exemplary embodiment, the video processing apparatus 100 may include the communication interface 130 to provide the video processing apparatus 100 with cable communication, wireless communication and/or Internet connectivity. The communication interface 130 may, for example, include a network interface card (NIC), or may include a wireless network adapter supporting wireless communication protocols such as Bluetooth, Wi-Fi (wireless compatibility certification) and/or 3G (third generation mobile communication technology). Further, the communication interface 130 may include both the NIC and the wireless network adapter, which the invention is not limited to.

The processor 110 is coupled to the memory 120 and configured for executing the instructions 121. For example, the processor 110 may perform video processing functions on a video file, such as compressing/decompressing, and/or coding/decoding, etc., though the invention is not limited thereto. For example, the processor 110 may be a central processing unit (CPU) and/or a microprocessor, though the invention is not limited thereto. Moreover, in an exemplary embodiment, after decoding the video file, the processor 110 may obtain video content and audio content of the video file, and the processor 110 may be configured to process video content and audio content respectively. By executing the instructions 121 in the memory 120, the processor 110 may be configured to analyze a digital video to obtain at least one video segment of the digital video, wherein a specific recognition result is shown in the at least one video segment.

Figure 2:
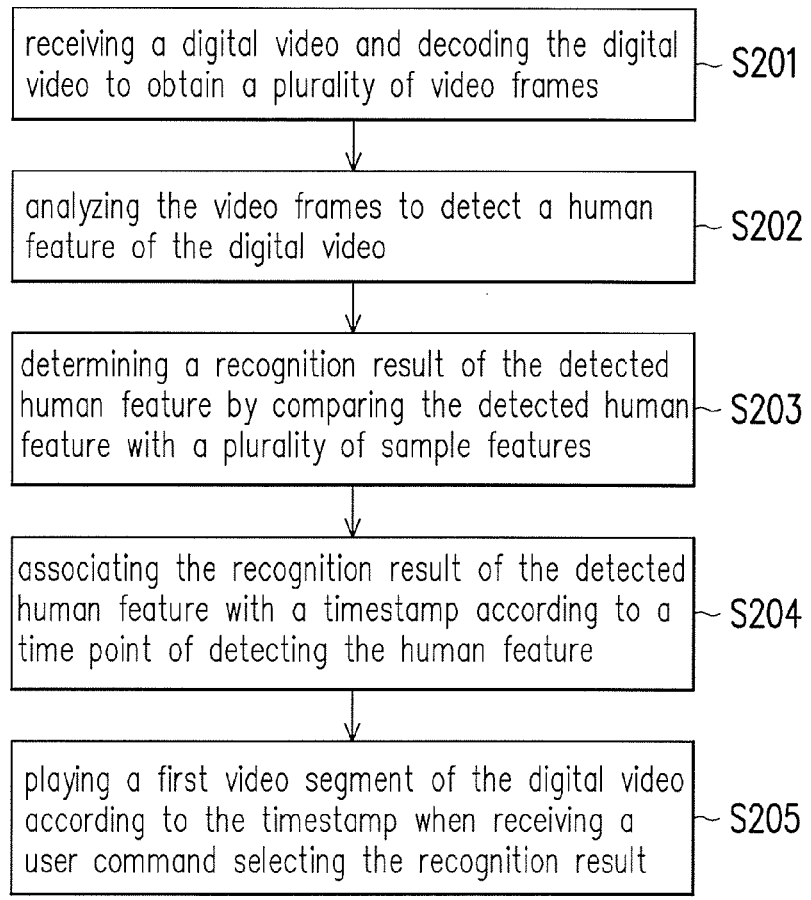
FIG. 2 is a flowchart illustrating the video processing and playing method according to an embodiment of the invention.

To be specific, FIG. 2 is a flowchart illustrating the video processing and playing method according to an embodiment of the invention. Referring to FIG. 1 and FIG. 2 together, the method of the present embodiment is suitable for the video processing apparatus 100, and detailed steps in the method of the present embodiment are described below with reference to each component of the video processing apparatus 100 in FIG. 1.

In step S201, the processor 110 may receive a digital video and decode the digital video to obtain a plurality of video frames. Each of the video frames would be displayed at a unique time point of the playback timeline of the digital video. In step S202, the processor 110 may analyze the video frames to detect a human feature of the digital video. The processor 110 may analyze all of or part of the frames of the digital video, which is not limited in the invention. The human feature may be a human face, a face expression, a body posture, or any other biometric feature of human beings, which is not limited in the invention. That is, by performing image analyzation on the video frames, the human feature of a person who is shown in the digital video may be detected.

In step 203, the processor 110 may determine a recognition result of the detected human feature by comparing the detected human feature with a plurality of sample features. That is, the recognition result of the detected human feature is deduced by the processor 110 by analyzing the human feature, wherein the sample features of the sample template have been establish and recorded in a database. In one exemplary embodiment, the recognition result may be a person that is recognized according to the human face detected form the video frames. In one exemplary embodiment, the recognition result may be an emotion that is recognized according to the face expression detected form the video frames. In one exemplary embodiment, the recognition result may be an action that is recognized according to the body posture detected form the video frames.

In step S204, the processor 110 may associate the recognition result of the detected human feature with a timestamp according to a time point of detecting the human feature. The timestamp may merely include a starting time point of a video segment on the playback timeline or may include both of the starting time point and an ending time point of a video segment on the playback timeline. In one exemplary embodiment, the time point of detecting the human feature is directly served as the starting time point of the timestamp associated with the recognition result by the processor 110.

In step S205, the processor 110 may play a first video segment of the digital video according to the timestamp when receiving a user command selecting the recognition result. That is, the video processing apparatus 100 may directly play the first video segment having the specific video content, such that the user may watch a specific video content directly without dragging the index on the playback timeline of the digital video.

Figure 3:
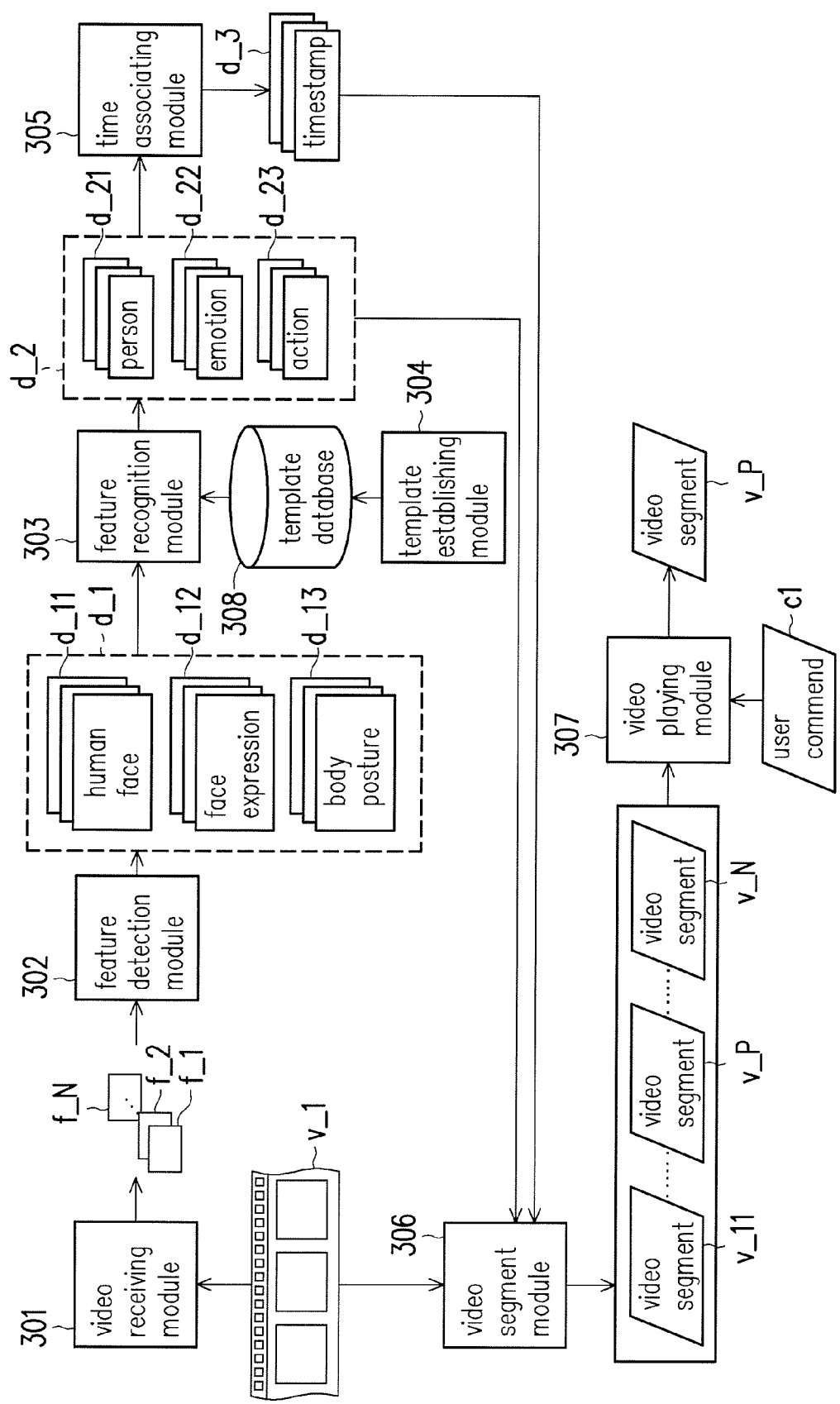
FIG. 3 is a schematic diagram illustrating the video processing and playing method according to an embodiment of the invention.

FIG. 3 is a schematic diagram illustrating the video processing and playing method according to an embodiment of the invention. Referring to FIG. 1 and FIG. 3 together, the method of the present embodiment is suitable for the video processing apparatus 100. In the exemplary embodiment of FIG. 3, it is assuming that the instructions 121 recorded in the memory 120 of the video processing apparatus 100 may include a plurality of modules, and the processor may execute each of the modules to implement the video processing and playing method (but the invention is not limited thereto). In the exemplary embodiment of FIG. 3, the modules include a video receiving module 301, a feature detecting module 302, a feature recognition module 303, a template establishing module 304, a time associating module 305, a video segment module 306, and a video playing module 307. In the other embodiments, the video receiving module 301, the feature detecting module 302, the feature recognition module 303, the template establishing module 304, the time associating module 305, the video segment module 306, and the video playing module 307 may be implemented by software, fiimware, hardware or a combination thereof, which is not limited by the invention. The software is, for example, source codes, operating system, application software or driving program, etc. The hardware is, for example, a central processing unit (CPU), or other programmable general-purpose or special-purpose microprocessor.

First, the processor 110 executing the video receiving module 301 is configured to receive a digital video v_1 and decode the digital video v_1 to obtain a plurality of video frames f_1 to f_N. The processor 110 executing the feature detecting module 302 is configured to analyze the video frames f_1 to f_N to detect a human feature d_1 of the digital video v_1, and then the processor 110 executing the feature recognition module 303 is configured to determine a recognition result d_2 of the detected human feature d_1 by comparing the detected human feature d_1 with a plurality of sample features in a template database 308.

That is, the template database 308 may be established beforehand. In one exemplary embodiment, the processor 110 executing the template establishing module 304 is configured to receive a plurality of sample images. The sample images with known information may include some images receptively showing different people, some images receptively showing different face expressions, some images receptively showing different body postures, or some images receptively showing different biometric features. Next, the processor 110 executing the template establishing module 304 is configured to generate the sample features based on the sample images and establish the template database 308 comprising the sample features. That is, the sample features are obtained by performing human feature detection and human feature recognition on the sample images whose carrying information has been known and confirmed already.

Figure 4:
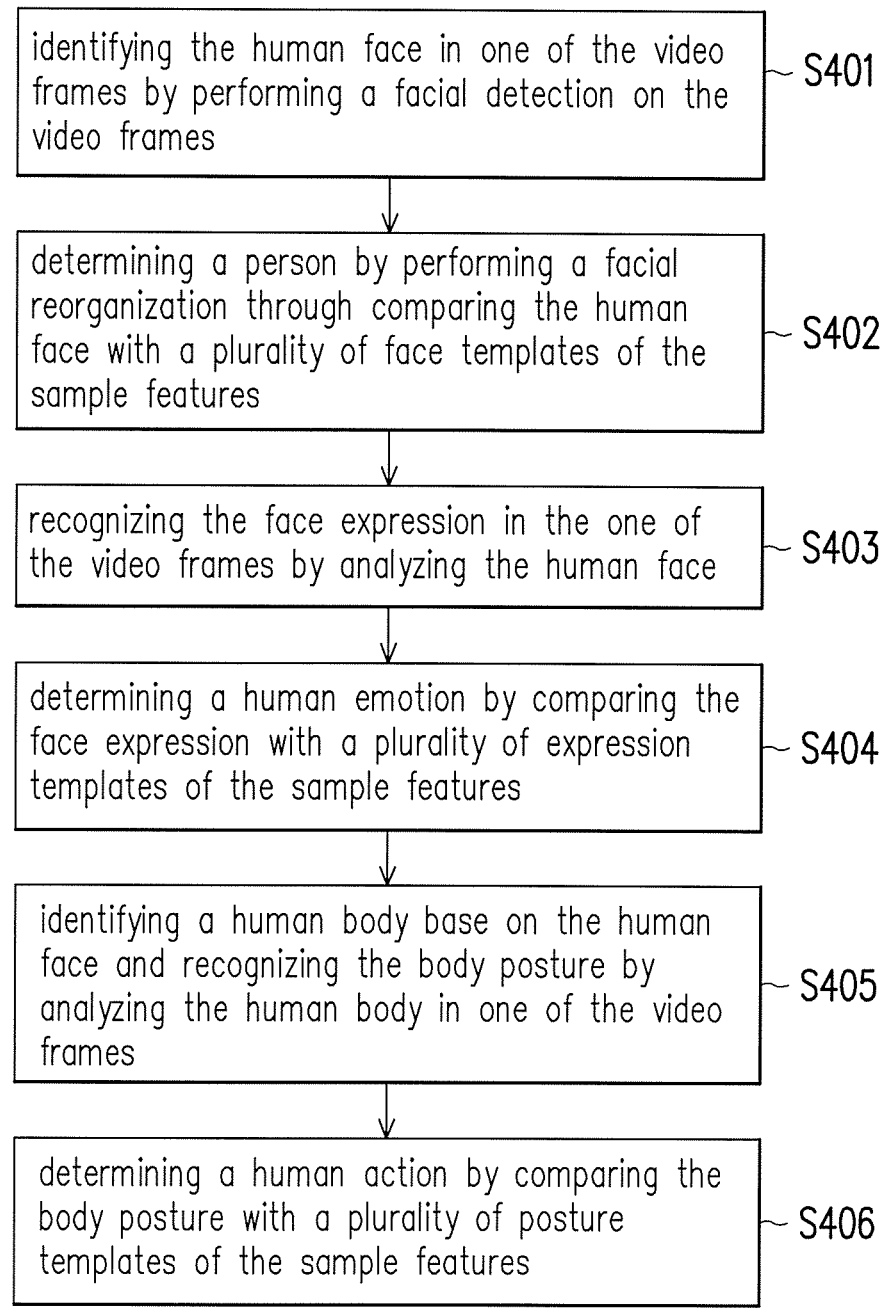
FIG. 4 is a flowchart illustrating detecting the human feature and determining the recognition result according to an embodiment of the invention.

In exemplary embodiment of FIG. 3, the human feature d_1 includes a human face d_11, a face expression d_12 and a body posture d_13, and the recognition result d_2 includes a person d_21, an emotion d_22 and an action d_23. To be specific, FIG. 4 is a flowchart illustrating detecting the human feature and determining the recognition result according to an embodiment of the invention. Referring to FIG. 4, in step S401, the processor 110 executing the feature detection module 302 may identify the human face d_11 in one of the video frames f_1 to f_N by performing a facial detection on the video frames f_1 to f_N. In step S402, the processor 110 executing the feature recognition module 303 may determine a person d_21 by performing a facial reorganization through comparing the human face d_11 with a plurality of face templates of the sample features.

In step S403, the processor 110 executing the feature detection module 302 may recognize the face expression d_12 in the one of the video frames f_1 to f_N by analyzing the human face d_11. In one exemplary embodiment, the processor 110 may detect the features, for example, a nose, eyes, eyebrows, lips and so on, of the human face. In step S404, the processor 110 executing the feature recognition module 303 may determine a human emotion d_22 by comparing the face expression d_21 with a plurality of expression templates of the sample features. In step S405, the processor 110 executing the feature detection module 302 may identify a human body base on the human face d_11 and recognizing the body posture d_13 by analyzing the human body in one of the video frames f_1 to f_N. In step S406, the processor 110 executing the feature recognition module 303 may determine a human action d_23 by comparing the body posture d_13 with a plurality of posture templates of the sample features.

Please referring to FIG. 3 again, after obtaining the recognition result d_2 of the digital video v_1, the processor 110 executing the time associating module 305 is configured to associate the recognition result d_2 of the detected human feature d_1 with a timestamp d_3 according to a time point of detecting the human feature d_1. Accordingly, the processor 110 executing the video segment module 306 is configured to segment the digital video vi according to the recognition result d_2 and the timestamp d_3 to obtain a plurality of video segments v_11 to v_N comprising a first video segment v_P.

It should be noted, the timestamp d_3 may include the ending time point of each of video segments v_11 to v_N or not include the ending time point of each of video segments v_11 to v_N. In one exemplary embodiment, the ending time point of each of video segments v_11 to v_N may be determined based on setting that each of the video segments v_11 to v_N have the same playback length, but the invention is not limited thereto. In one exemplary embodiment, the ending time point of each of video segments v_11 to v_N may be determined based on the time point at which the recognition result stop showing.

When the digital video v_1 is selected to be played by the user attempting to watch some highlight of the digital video v_1, the processor 110 executing the video playing module is configured to play the first video segment v_P of the digital video v_1 according to the timestamp of the first video segment v_P when receiving a user command c1 selecting the recognition result d_2.

In one exemplary embodiment, the digital video may be analyzed by a video sharing platform including the video processing apparatus of the invention, and the recognition result and the corresponding timestamp are stored. Furthermore, a plurality of candidates of the recognition result may be provided to the user for assisting the user to choose the video content interesting the user. Moreover, the recognition result may be associated with a plurality of timestamps, since the recognition result may appear in the digital video many times. Hence, in one exemplary embodiment, when the user selects one of the candidates of the recognition result, more than one video segments may be played successively.

Figure 5A:
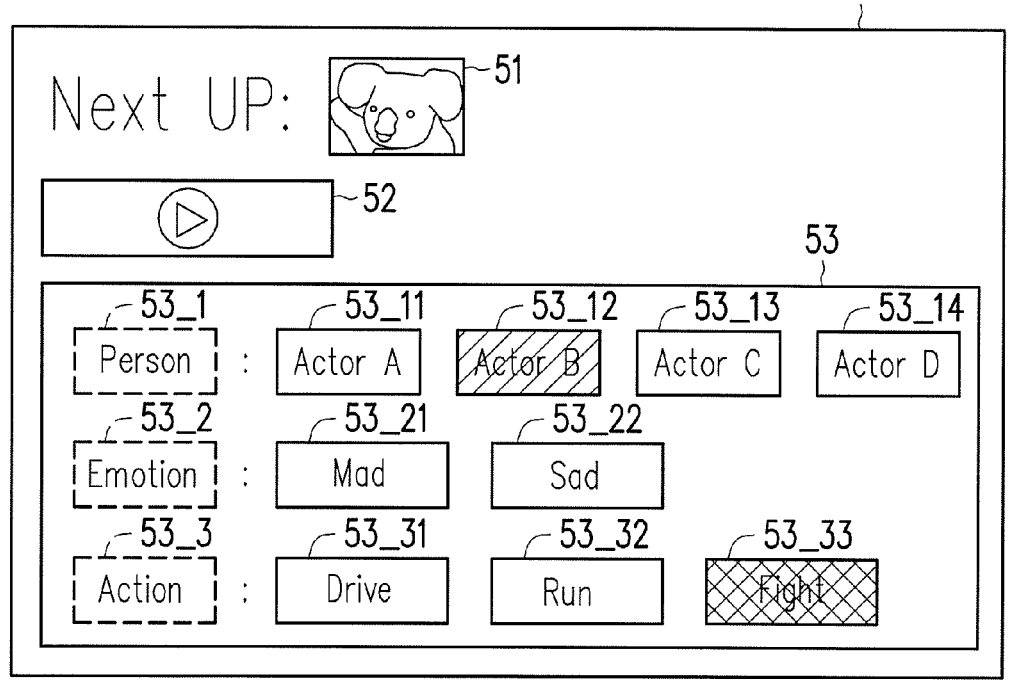
FIG. 5A is a schematic diagram illustrating displaying the candidates associated with the recognition result according to an embodiment of the invention.

For example, FIG. 5A is a schematic diagram illustrating displaying the candidates associated with the recognition result according to an embodiment of the invention. Referring to FIG. 5A, a screen of the display 181 may display a thumbnail of a digital video 51 to be played. The screen of the display 181 may display an option item 52 and a video content menu 53, and the video content menu 53 may display a plurality of candidates 53_11, 53_12, 53_13, 53_14, 53_21, 53_22, 53_31, 53_32, and 53_33 associated with the recognition result 53_1 to 53_3. For example, the candidate 53_11 of the recognition result 53_1 is "Actor A", the candidate 53_12 of the recognition result 53_1 is "Actor B" and so on. That is, "Actor A", "Actor B", "Actor C", and "Actor D" are shown in the digital video 51, which are recognized according to the method described in FIG. 2 to FIG. 4 above.

Similarly, the candidate 53_21 of the recognition result 53_2 is "Mad", the candidate 53_22 of the recognition result 53_2 is "Sad". That is, "Mad" and "Sad" are the emotion presented by the people showing in the digital video 51, which are recognized according to the method described in FIG. 2 to FIG. 4 above. Similarly, the candidate 53_31 of the recognition result 53_3 is "Drive", the candidate 53_32 of the recognition result 53_3 is "Run", and the candidate 53_33 of the recognition result 53_3 is "Fight". That is, "Drive", "Run" and "Fight" are the action presented by the people showing in the digital video 51, which are recognized according to the method described in FIG. 2 to FIG. 4 above. However, FIG. 5A is merely illustrated for describing the invention more clearly, but the invention is not limited thereto.

Figure 5B:
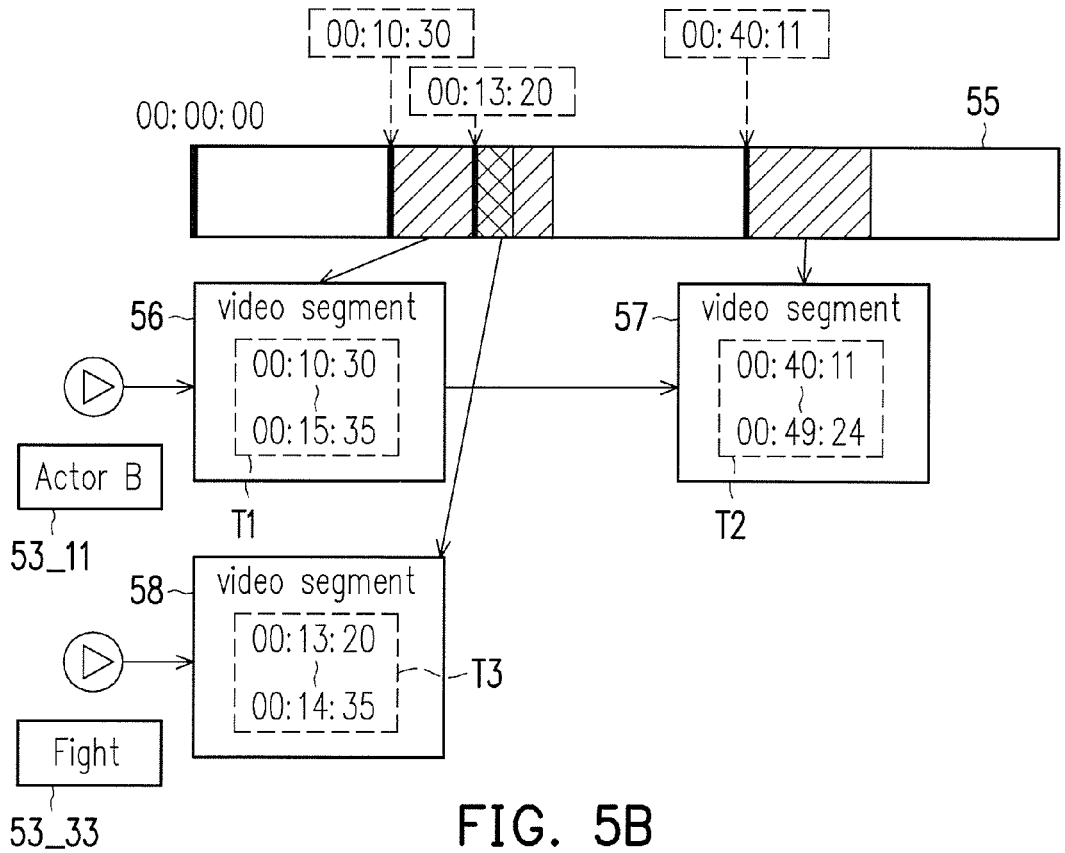
FIG. 5B is a schematic diagram illustrating playing the video segments according to the user command according to an embodiment of the invention.

FIG. 5B is a schematic diagram illustrating playing the video segments according to the user command according to an embodiment of the invention. Please referring to FIG. 5A and FIG. 5B together, the whole digital video 51 may be played from the beginning of the playback timeline 55 of the digital video 51 when the user selects the option item 52. The aspect of the option item 52 is not limited in the invention. An example time point of a timestamp can be provided in terms of time (e.g., [hours]:[minutes]:[seconds]). On the other hand, the video segment 56 and the video segment 57 of the digital video 51 may be successively played when receiving the user command selecting the candidate 53_12. Namely, some parts of the digital video may be skipped. For example, the video content in the period of "00:00:00-00:10:29" may be skipped and not be played.

More specifically, the timestamp T1 "00:10:30-00:15:35" associated with the candidate 53_12 of the recognition result 53_1 is determined according to the time point of detecting the human face that is recognized as "Actor B". Similarly, the timestamp T2 "00:40:11-00:49:24" associated with the candidate 53_12 of the recognition result 53_1 is determined according to the time point of detecting the human face that is recognized as "Actor B". Further, the video segment 58 of the digital video 51 may be played when receiving the user command selecting the candidate 53_33. Specifically, the timestamp T3 "00:13:20-00:14:35" associated with the candidate 53_33 of the recognition result 53_3 is determined according to the time point of detecting the body posture that is recognized as "Fight".

In summary, according to the video processing and playing method and the video processing apparatus in the invention, the digital video is analyzed to detect the human feature of the digital video, and the playback time point of the recognition result on the playback timeline may be discovered. Therefore, by selecting the recognition result that interests the user, the user may directly watch a video segment in which the recognition result is shown without redundant operation, which effectively advances the user experience. Furthermore, the video segments may be abstracted and classified according to the characters, the emotion of the characters and the action of the characters, such that the user is able to browse the digital video quickly and obtain the important information from the digital video promptly.

Since the invention does not limit what device to perform the video processing and playing method, and the device may be, for example, an electronic device of a client or a multimedia file sharing device of a server, so that the invention may be directly used in various electronic devices with multimedia file playing function or multimedia file playing software on the present market.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A video processing and playing method, adapted to a video processing apparatus, comprising:

receiving a digital video and decoding the digital video to obtain a plurality of video frames;

analyzing the video frames of the digital video by detecting a human feature in the video frames of the digital video;

determining a recognition result of the detected human feature by comparing the detected human feature with a plurality of sample features;

associating the recognition result of the detected human feature with a timestamp according to a time point of detecting the human feature;

segmenting the digital video according to the recognition result of the digital video and the timestamp to obtain a plurality of video segments comprising a first video segment; and playing the first video segment of the digital video according to the timestamp when receiving a user command selecting the recognition result.

2. The video playing method according to claim 1, wherein the human feature comprises a human face, and the step of analyzing the video frames to detect the human feature of the digital video comprises:

identifying the human face in one of the video frames by performing a facial detection on the video frames.

3. The video playing method according to claim 2, wherein the step of determining the recognition result of the detected human feature by comparing the detected human feature with the sample features comprises:

determining a person by performing a facial reorganization through comparing the human face with a plurality of face templates of the sample features.

4. The video playing method according to claim 2, wherein the human feature further comprises a face expression, and the step of analyzing the video frames to detect the human feature of the digital video further comprises:

recognizing the face expression in the one of the video frames by analyzing the human face.

5. The video playing method according to claim 4, wherein the step of determining the recognition result of the detected human feature by comparing the detected human feature with the sample features comprises:

determining a human emotion by comparing the face expression with a plurality of expression templates of the sample features.

6. The video playing method according to claim 2, wherein the human feature further comprises a body posture, and the step of analyzing the video frames to detect the human feature of the digital video further comprises:

identifying a human body base on the human face and recognizing the body posture by analyzing the human body in one of the video frames.

7. The video playing method according to claim 6, wherein the step of determining the recognition result of the detected human feature by comparing the detected human feature with the sample features comprises:

determining a human action by comparing the body posture with a plurality of posture templates of the sample features.

8. The video playing method according to claim 1, further comprises:

receiving a plurality of sample images;

generating the sample features based on the sample images; and establishing a template database comprising the sample features.

9. The video playing method according to claim 1, wherein the step of playing the first video segment of the digital video according to the timestamp when receiving the user command selecting the recognition result comprises:

displaying a plurality of candidates associated with the recognition result on a screen; and successively playing the first video segment and a second video segment among the video segments according to the timestamp when receiving the user command selecting one of the candidates, wherein the recognition result corresponding to the one of the candidates is shown in the first video segment and the second video segment.

10. A video processing apparatus, comprising:

a memory, storing a plurality of instructions; and a processor, coupled to the memory and configured for executing the instructions to:

receive a digital video and decoding the digital video to obtain a plurality of video frames;

analyze the video frames of the digital video by detecting a human feature in the video frames of the digital video;

determine a recognition result of the detected human feature by comparing the detected human feature with a plurality of sample features;

associate the recognition result of the detected human feature with a timestamp according to a time point of detecting the human feature;

segment the digital video according to the recognition result of the digital video and the timestamp to obtain a plurality of video segments comprising a first video segment; and play the first video segment of the digital video according to the timestamp when receiving a user command selecting the recognition result.

11. The video processing apparatus according to claim 10, wherein the human feature comprises a human face, and the processor is configured to identify the human face in one of the video frames by performing a facial detection on the video frames.

12. The video processing apparatus according to claim 11, wherein the processor is configured to determine a person by performing a facial reorganization through comparing the human face with a plurality of face templates of the sample features.

13. The video processing apparatus according to claim 11, wherein the human feature further comprises a face expression, and the processor is configured to recognize the face expression in the one of the video frames by analyzing the human face.

14. The video processing apparatus according to claim 13, wherein the processor is configured to determine a human emotion by comparing the face expression with a plurality of expression templates of the sample features.

15. The video processing apparatus according to claim 11, wherein the human feature further comprises a body posture, and the processor is configured to identify a human body base on the human face and recognize the body posture by analyzing the human body in one of the video frames.

16. The video processing apparatus according to claim 15, wherein the processor is configured to determine a human action by comparing the body posture with a plurality of posture templates of the sample features.

17. The video processing apparatus according to claim 10, wherein the processor is configured to receive a plurality of sample images, generate the sample features based on the sample images, and establish a template database comprising the sample features.

18. The video processing apparatus according to claim 1, wherein the processor is configured to display a plurality of candidates associated with the recognition result on the screen, and successively play the first video segment and a second video segment among the video segments according to the timestamp when receiving the user command selecting one of the candidates, wherein the recognition result corresponding to the one of the candidates is shown in the first video segment and the second video segment.

* * * * *